United States Patent [19]
Kitada

[11] Patent Number: 5,588,498
[45] Date of Patent: Dec. 31, 1996

[54] ELECTRIC HYBRID VEHICLE

[75] Inventor: Shinichiro Kitada, Tokyo, Japan

[73] Assignee: Nissan Motor Co., Ltd., Yokohama, Japan

[21] Appl. No.: 135,515

[22] Filed: Oct. 13, 1993

[30] Foreign Application Priority Data

Oct. 21, 1992 [JP] Japan ................................. 4-282562

[51] Int. Cl.$^6$ .................................................. B60K 6/02
[52] U.S. Cl. ...................... 180/65.4; 180/65.8; 180/69.4; 123/179.18
[58] Field of Search ............................ 180/65.3, 65.4, 180/65.8, 65.2, 69.4; 123/46 E, 179.18

[56] References Cited

U.S. PATENT DOCUMENTS

| | | | |
|---|---|---|---|
| 3,960,130 | 6/1976 | Peterson, Jr. | 123/179.18 |
| 4,407,132 | 10/1983 | Kawakatsu et al. | 180/65.4 |
| 4,523,561 | 6/1985 | Kosuge | 123/179.18 X |
| 4,711,744 | 12/1987 | Scott et al. | 123/179.18 X |
| 4,886,035 | 12/1989 | Tonobe et al. | 123/179.18 X |
| 5,002,020 | 3/1991 | Kos | 123/46 E |
| 5,010,863 | 4/1991 | Ishida et al. | 123/179.18 |
| 5,212,431 | 5/1993 | Origuchi et al. | 180/65.4 X |
| 5,323,868 | 6/1994 | Kawashima | 180/65.3 X |
| 5,327,991 | 7/1994 | Yoshida | 180/65.4 |
| 5,346,031 | 9/1994 | Gardner | 180/65.4 X |
| 5,371,412 | 12/1994 | Iwashita et al. | 180/69.4 X |

FOREIGN PATENT DOCUMENTS

| | | | |
|---|---|---|---|
| 2306337 | 8/1974 | Germany | 123/179.18 |
| 0032648 | 2/1984 | Japan | 123/179.18 |
| 0113172 | 5/1988 | Japan | 123/179.18 |
| 3-143201 | 6/1991 | Japan . | |

*Primary Examiner*—Brian L. Johnson
*Attorney, Agent, or Firm*—Lowe, Price, LeBlanc & Becker

[57] ABSTRACT

An electric hybrid vehicle has an engine for driving a generator to supply electric power to a vehicle driving motor. The engine with a catalytic converter is operated when a charged condition of a battery for mainly supplying electric power to the motor is low. The engine is controlled to suppress the amount of intake air by controlling an air control valve for a predetermined time after starting of the engine. The amount of the intake air is then gradually increased until the engine generates a rating output. Therefore, the emission characteristics of the catalytic converter is largely improved.

15 Claims, 16 Drawing Sheets

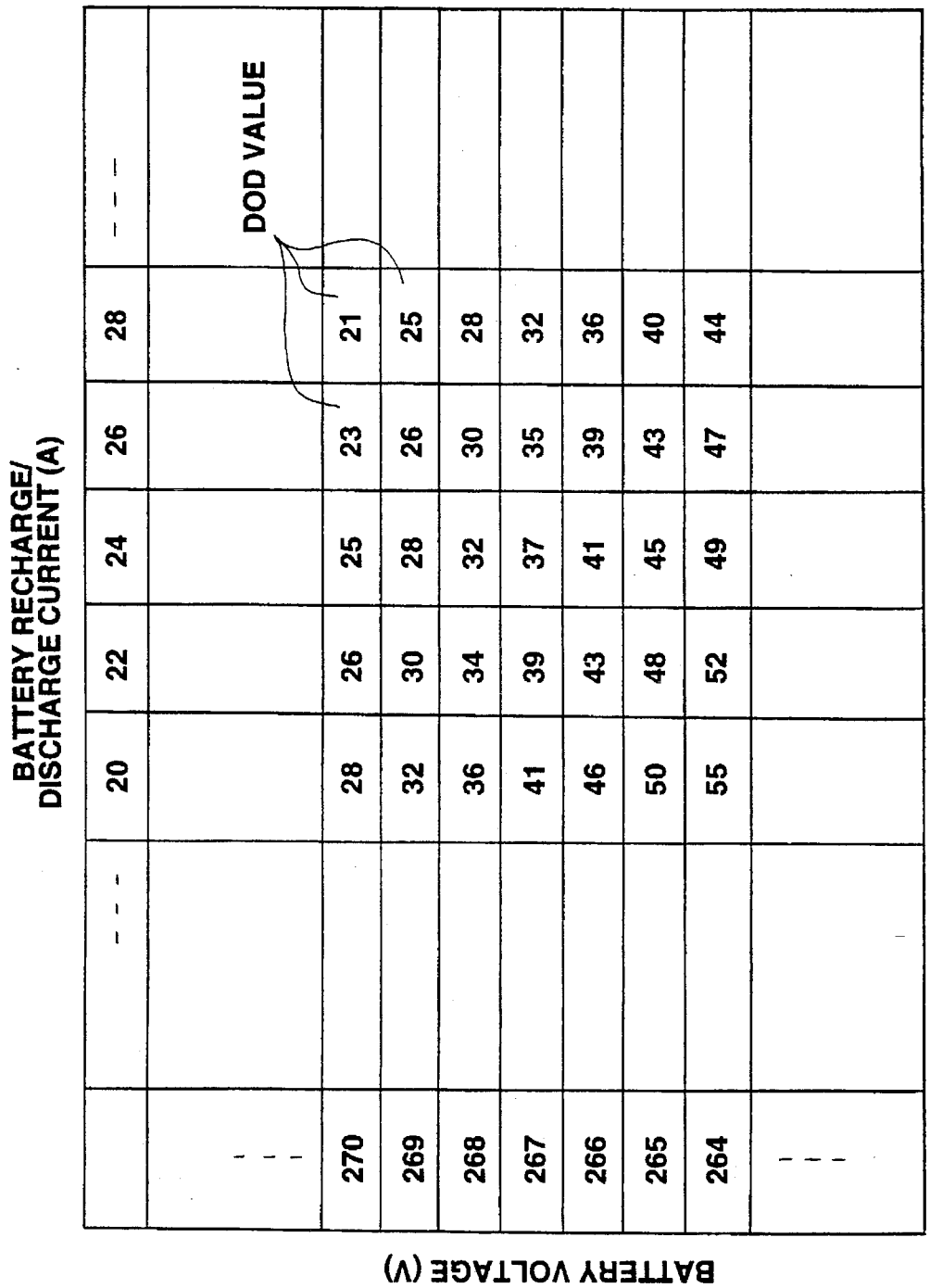

ELECTRIC HYBRID VEHICLE

BACKGROUND OF THE INVENTION

1. Field of the Invention

The present invention relates to improvements in an electric hybrid vehicle in which a motor for driving a vehicle body receives an electric power from a battery and an engine-driven generator.

2. Description of the Prior Art

Japanese Patent Provisional Publication No. 3-143201 discloses a typical electric hybrid vehicle which is provided with a battery and a generator driven by an engine. The electric hybrid vehicle is arranged such that an ON-OFF operation of the engine for the generator is controlled according to a battery charged condition. More particularly, when the battery is in a fully charged condition, the engine is stopped and the motor is rotated by using electric power from the battery. When the battery charged condition becomes lower than a first predetermined value, the engine is started to drive the generator. The electric power from the generator is used to rotate the motor and to charge the battery until the battery charged condition becomes higher than a second predetermined value. Further, the output of the engine is automatically controlled such that the rotating speed of the generator is set at a rating point by controlling an actuator and the like connected to a throttle valve of the engine.

However, in this conventional electric hybrid vehicle, since the engine is intermittently operated at a rating rotating speed, a lot of exhaust gas is discharged before the catalyst of a catalytic converter becomes active in temperature. Thus, the conventional electric hybrid vehicle operates in a manner which degrades a significant advantage of an electric vehicle as being low pollution vehicle.

SUMMARY OF THE INVENTION

It is an object of the present invention to provide an improved electric hybrid vehicle in which an engine for operating a generator is controlled so as to suppress the amount of exhaust emissions from the engine.

An electric hybrid vehicle according to the present invention comprises a motor for driving a vehicle body of the electric hybrid vehicle. A battery for an electric source of the motor is repeatingly rechargeable and connected to the motor. A generator is connected to the battery and the motor. An engine is connected to the generator for operating the generators and has a catalytic converter for purifying exhaust gas from the engine. An intake air controlling means controls the amount of intake air to the engine. A intake air suppressing means suppresses the amount of the intake air at a predetermined small flow rate by means of the intake air controlling means for a desired time after starting of said engine.

With this arrangement, the amount of the intake air is suppressed for a predetermined time after starting of the engine so as to prevent the degrade of the emission due to the insufficient warming of the catalytic converter.

BRIEF DESCRIPTION OF THE DRAWINGS

In the drawings, like reference numerals designate like parts and like elements throughout all figures, in which.

Figure 1:
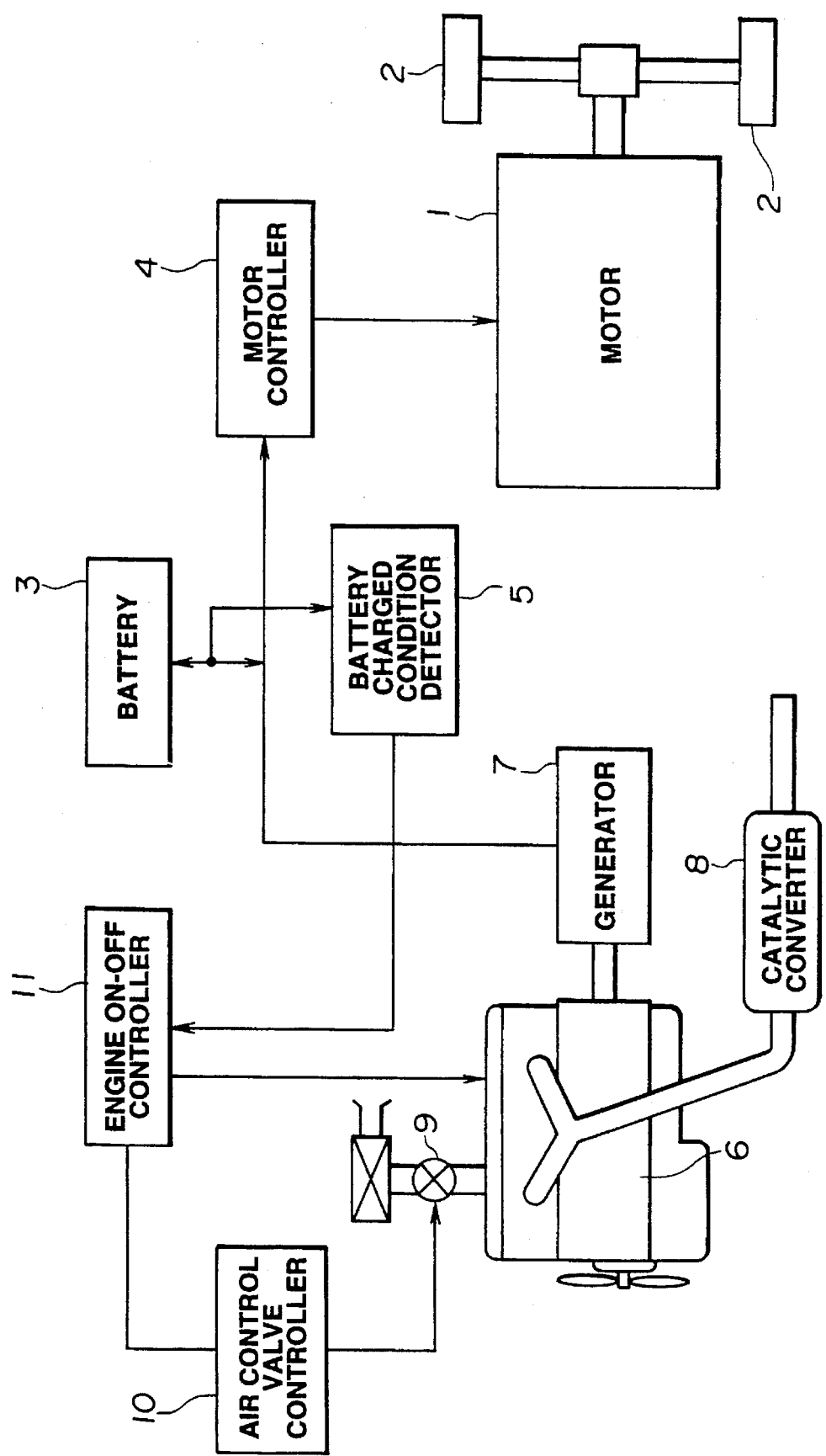
FIG. 1 is a block diagram which shows a structure of a first embodiment of an electric hybrid vehicle according to the present invention.
Figure 4:
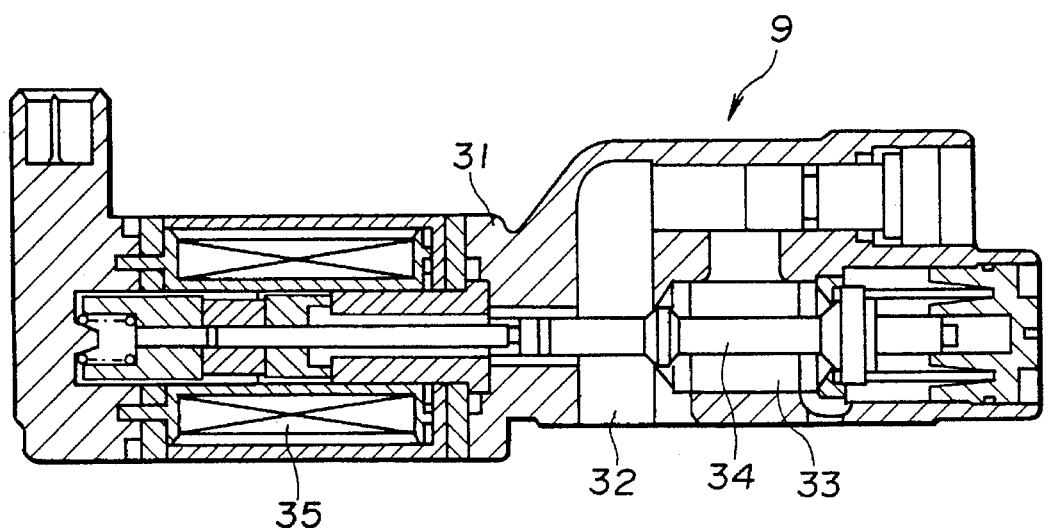
Figure 5:
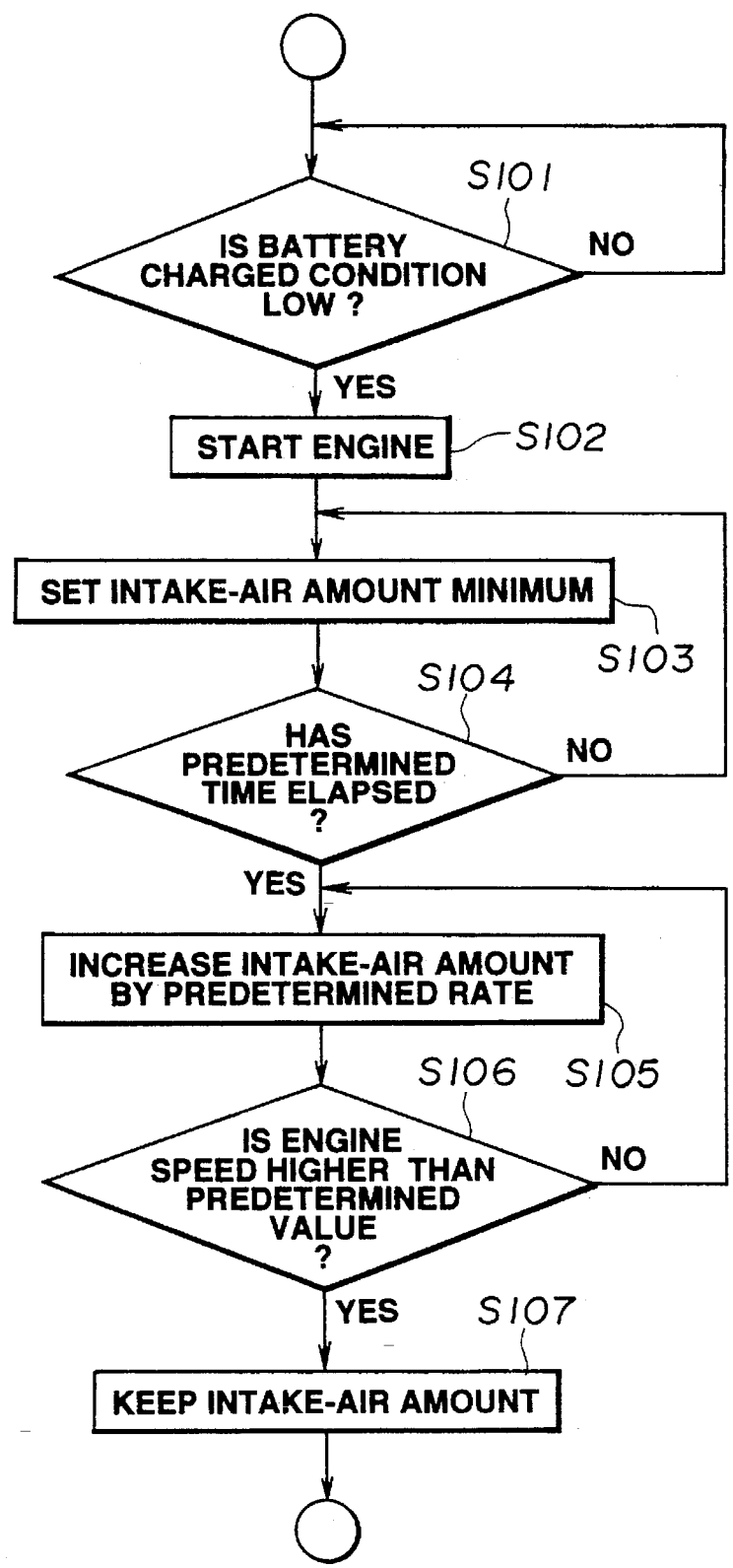
Figure 6:
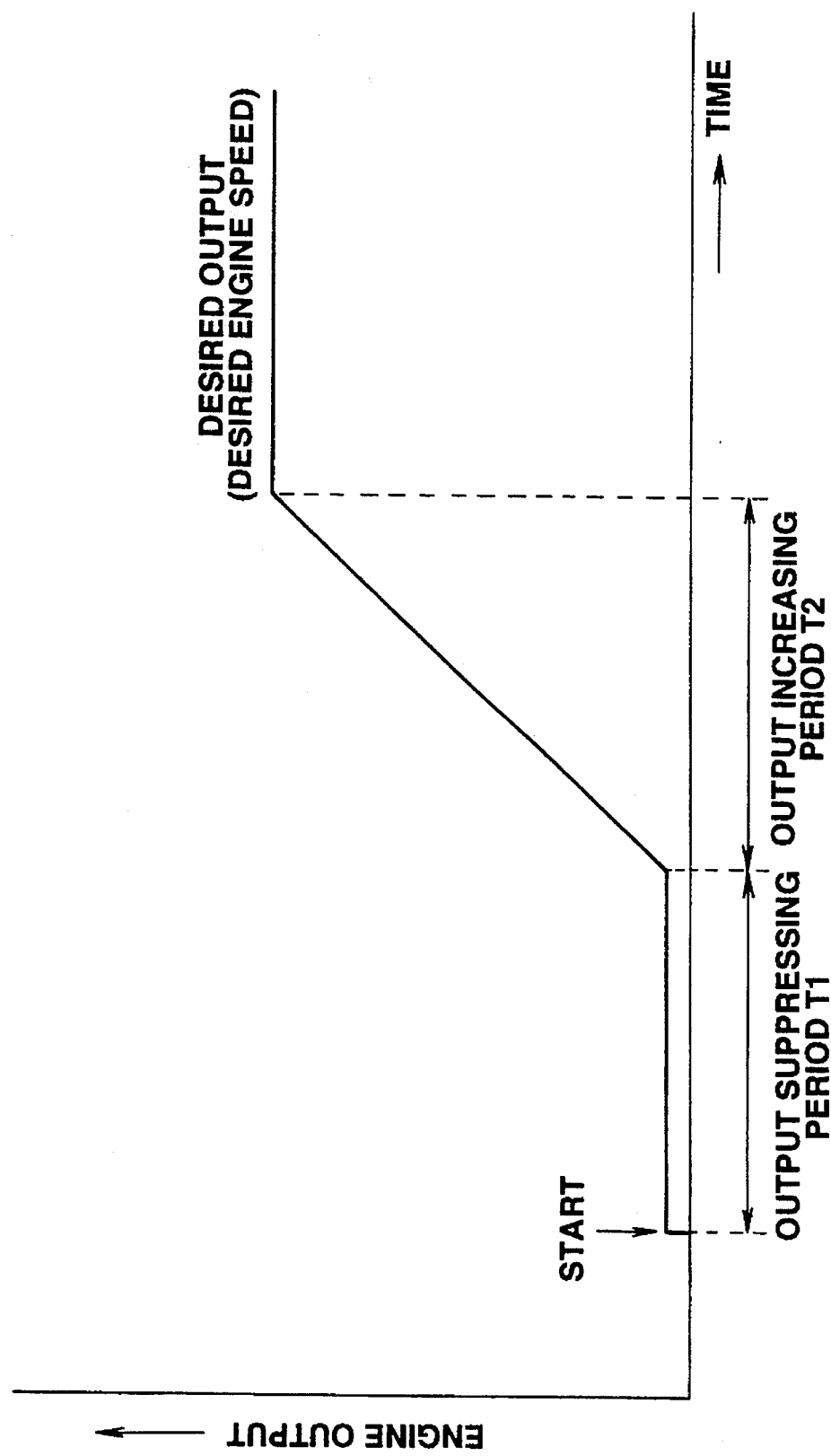
Figure 7:
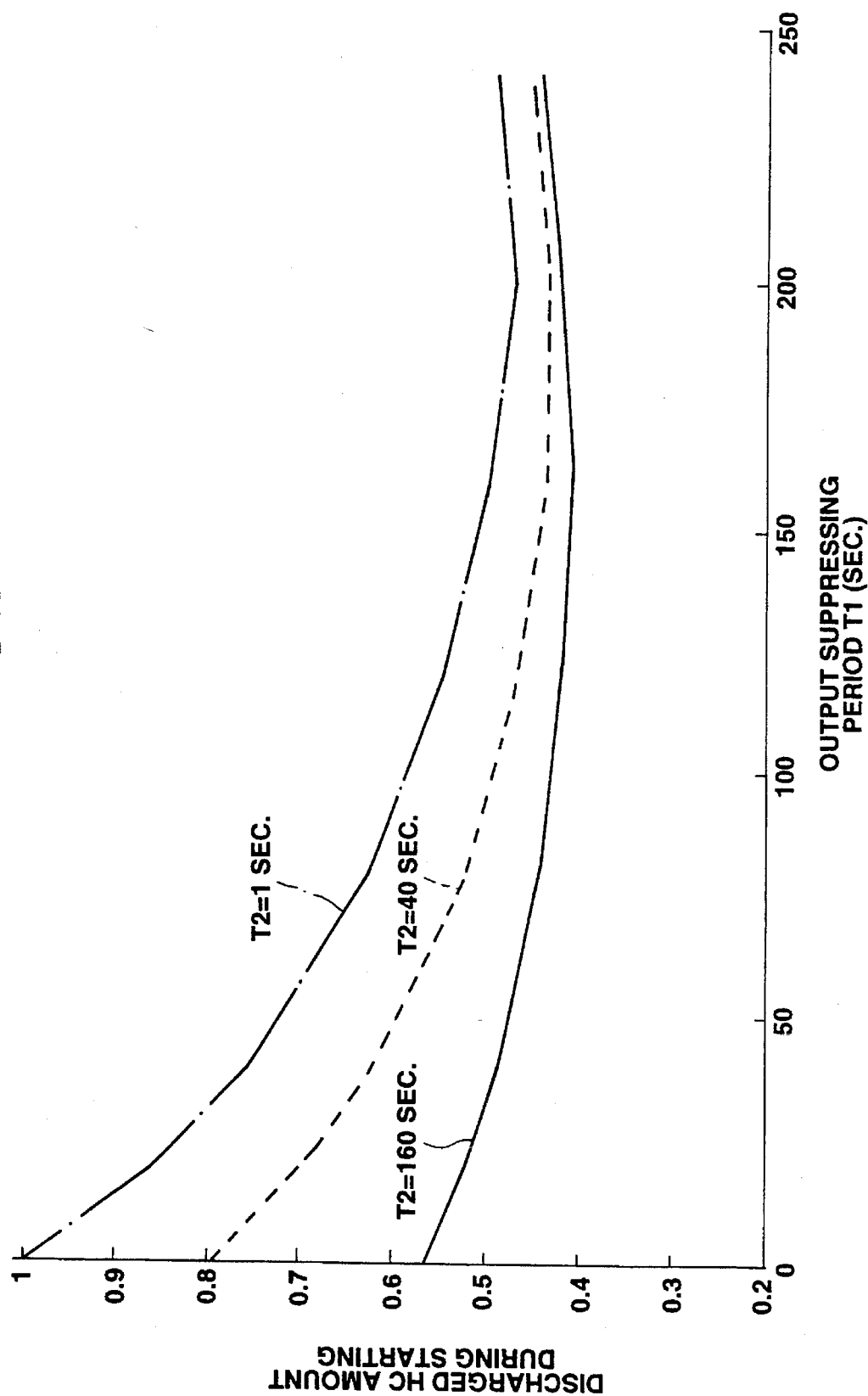
Figure 8:
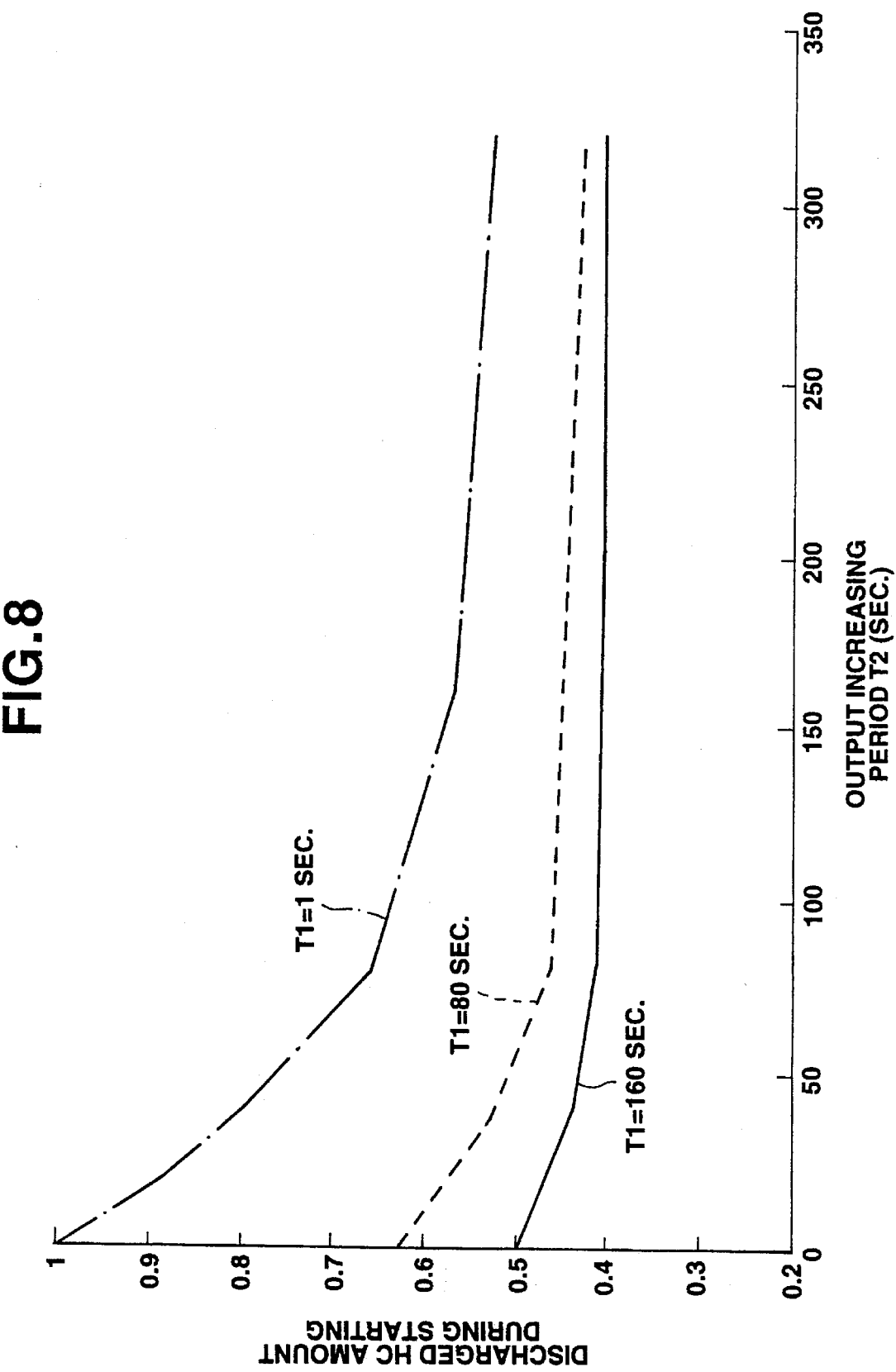
Figure 9:
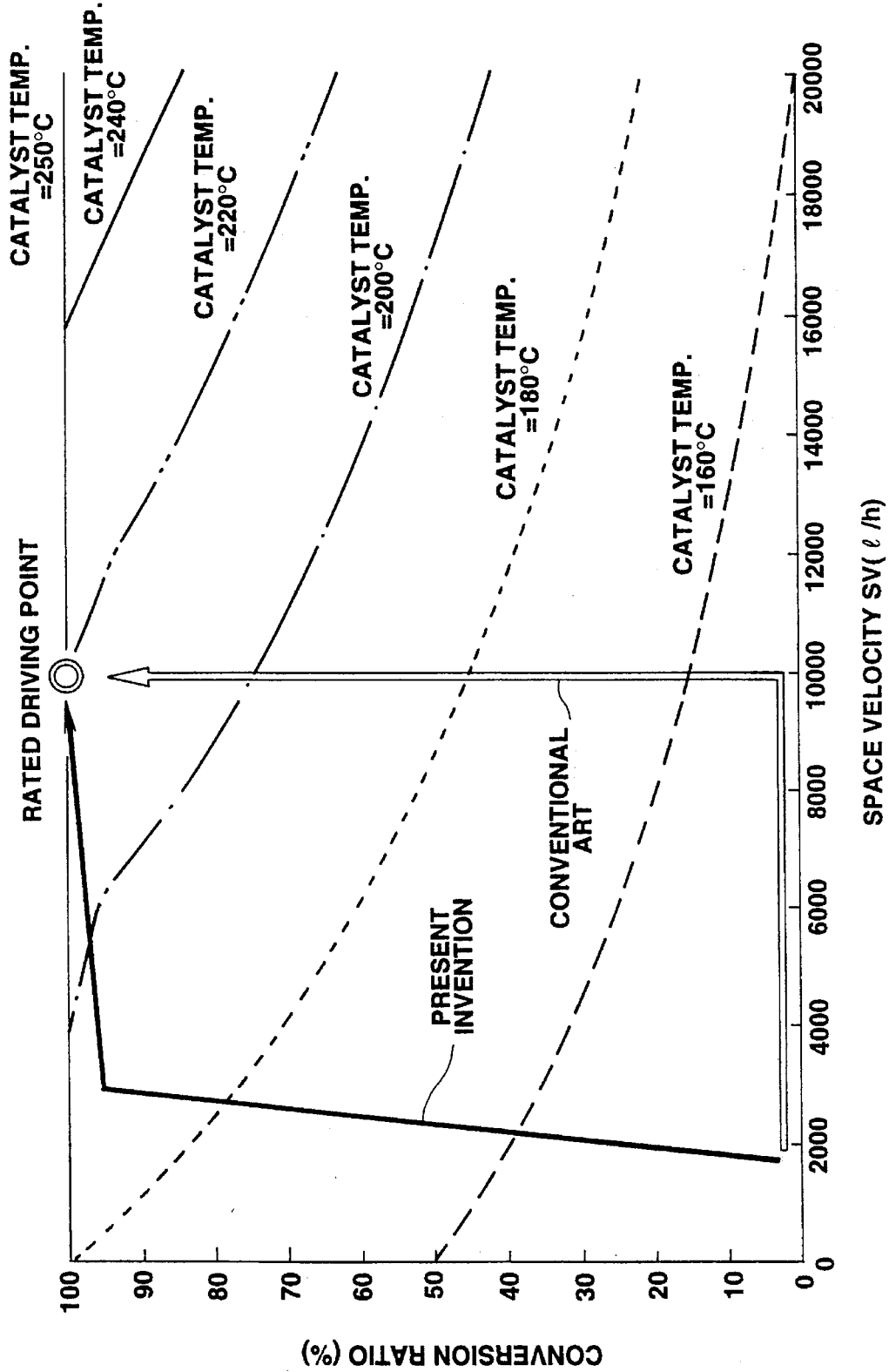
Figure 10:
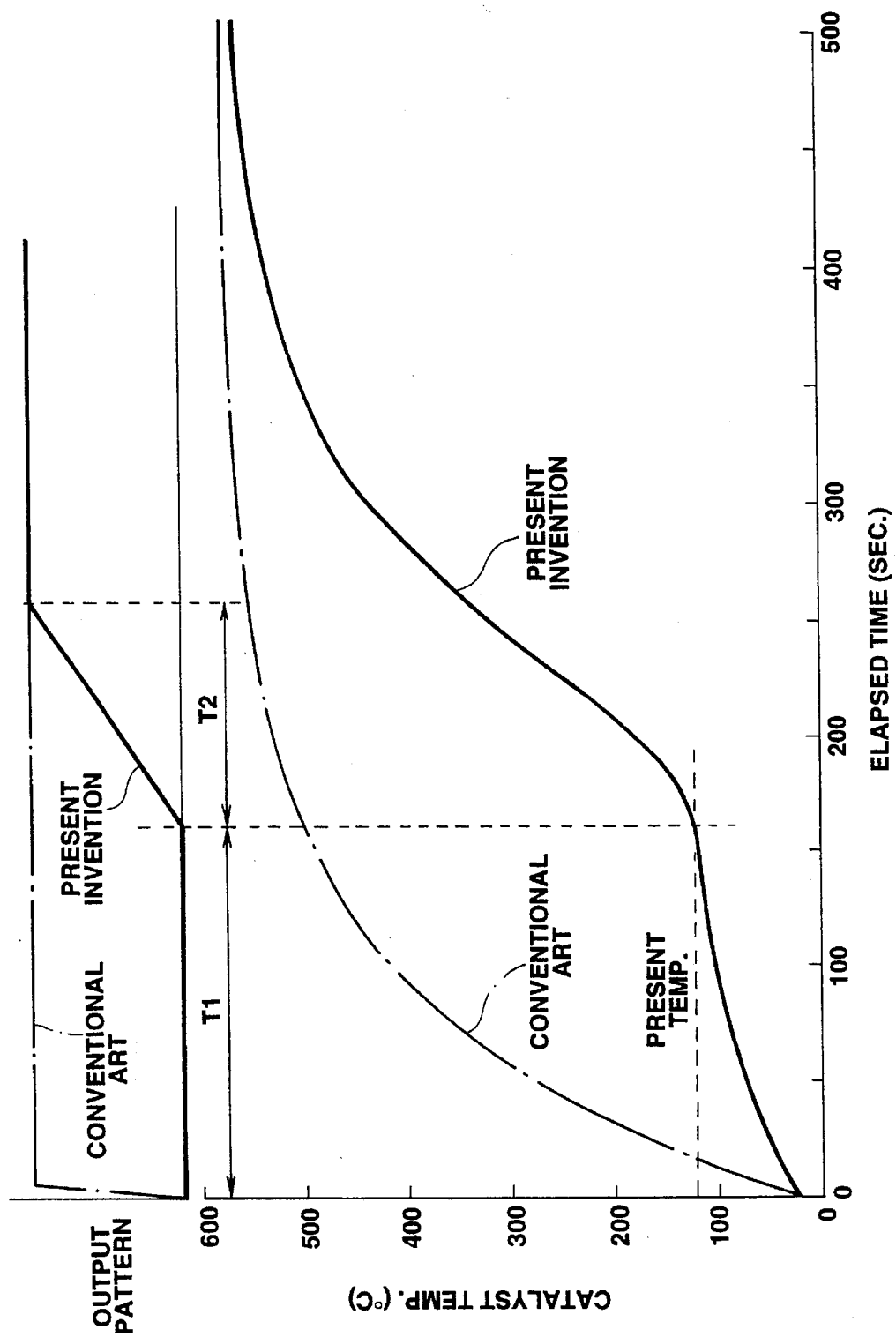
Figure 11:
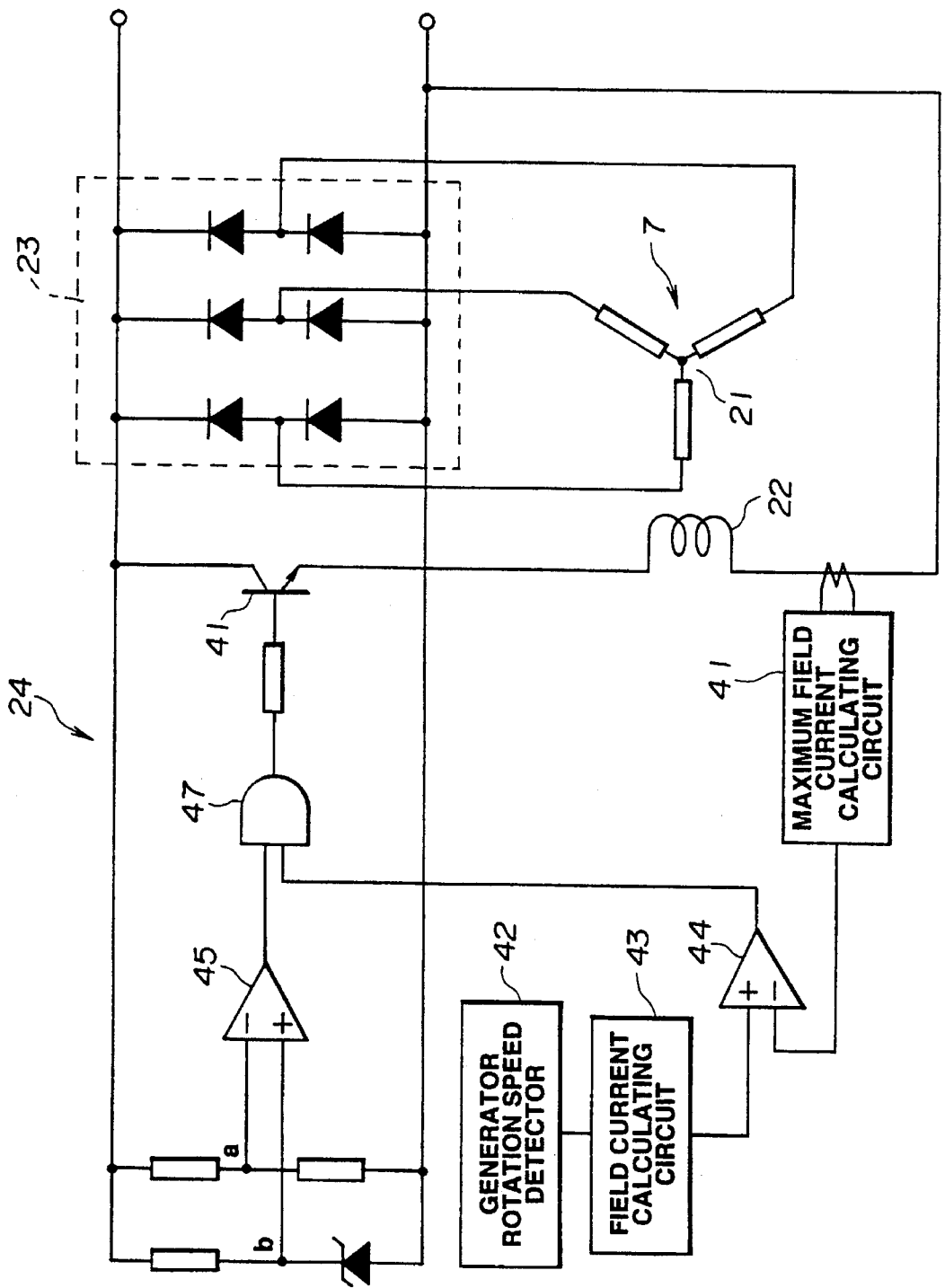
Figure 12:
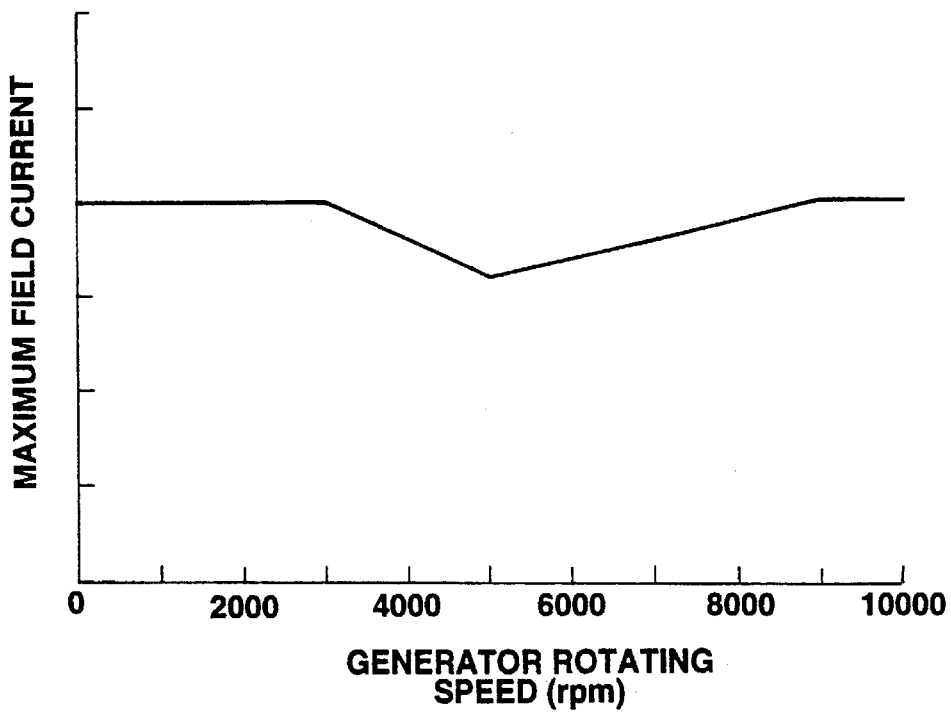
Figure 13:
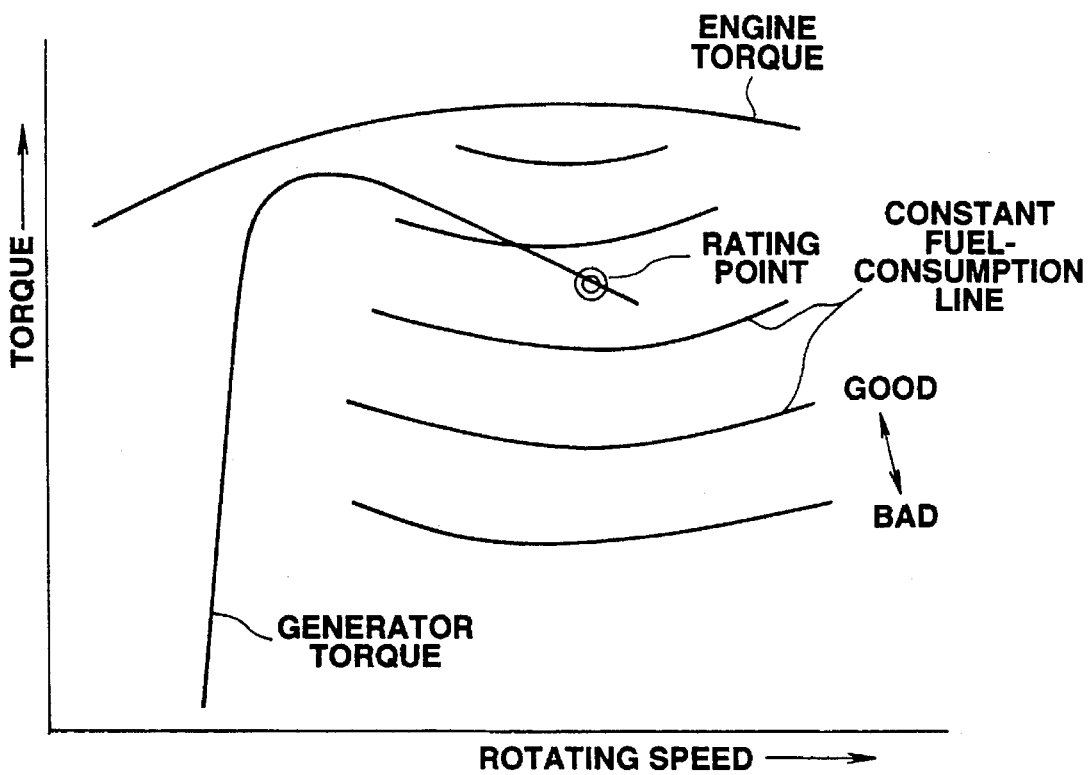
Figure 14:
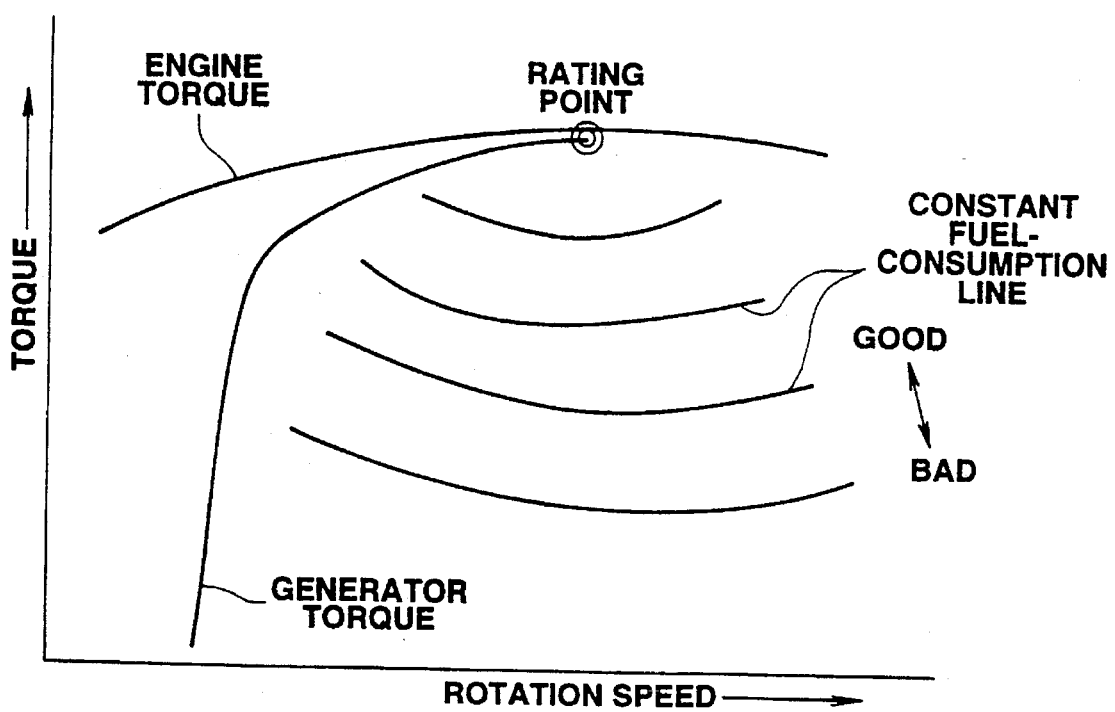
Figure 15:
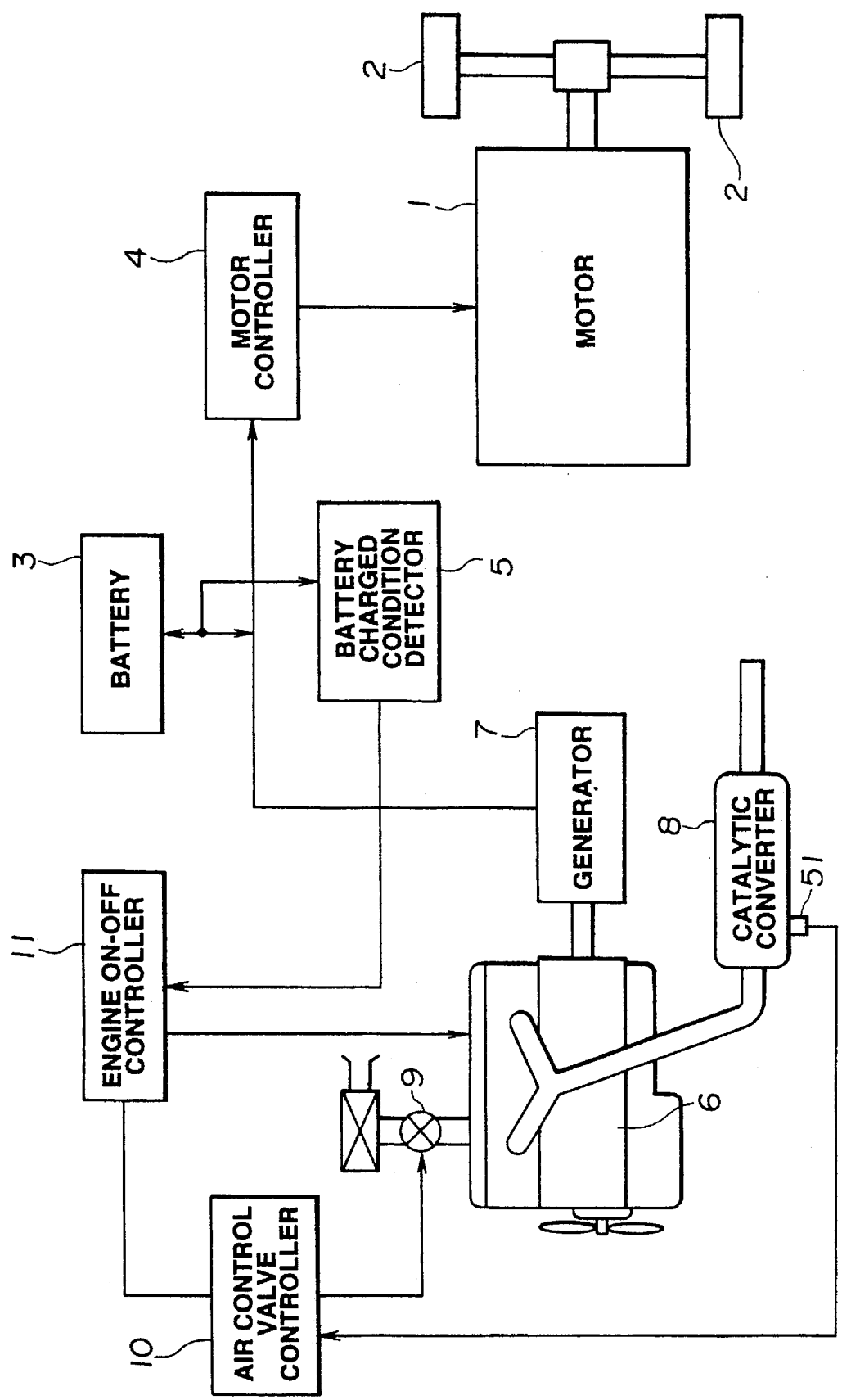
Figure 16:
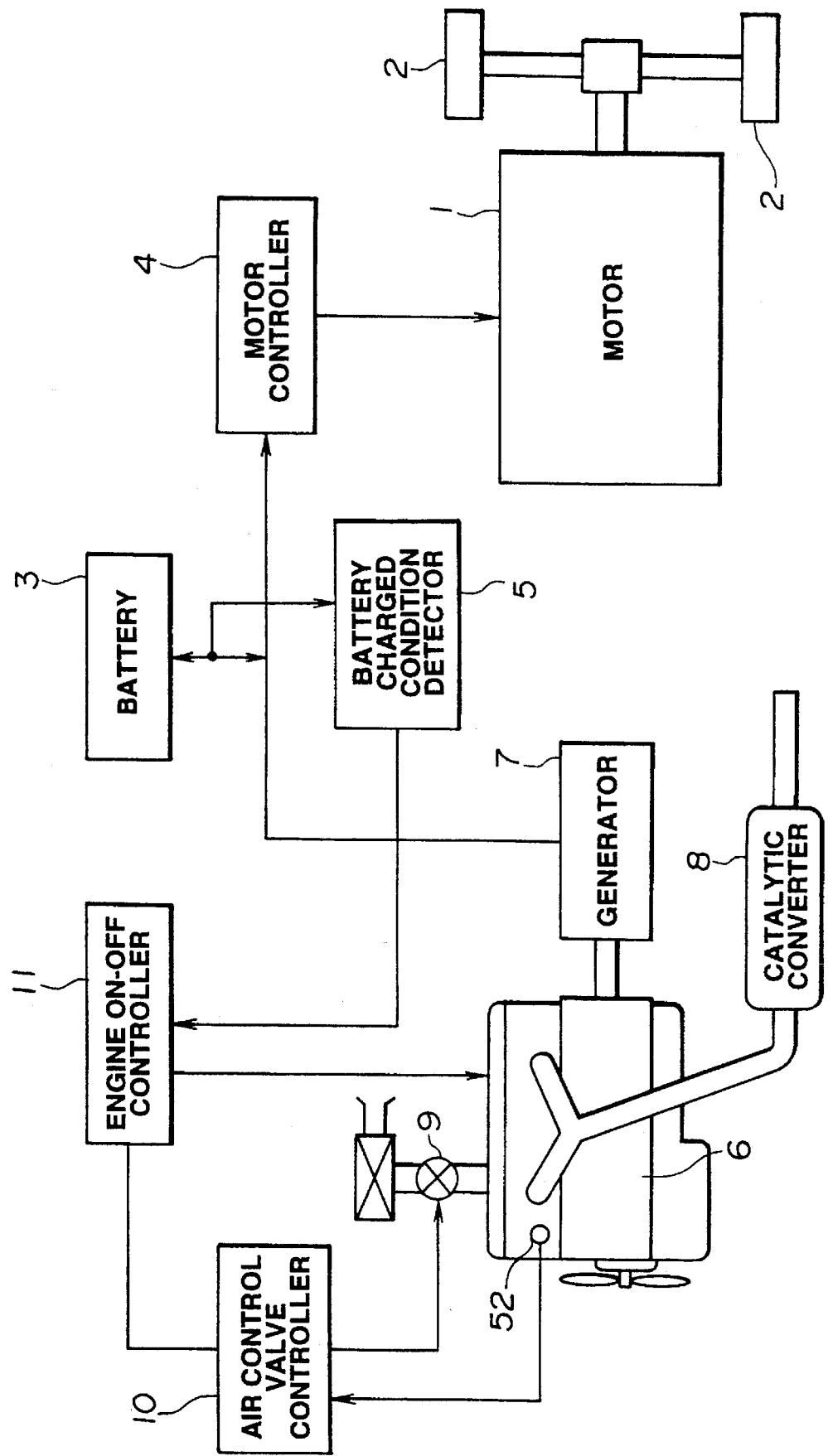
Figure 17:
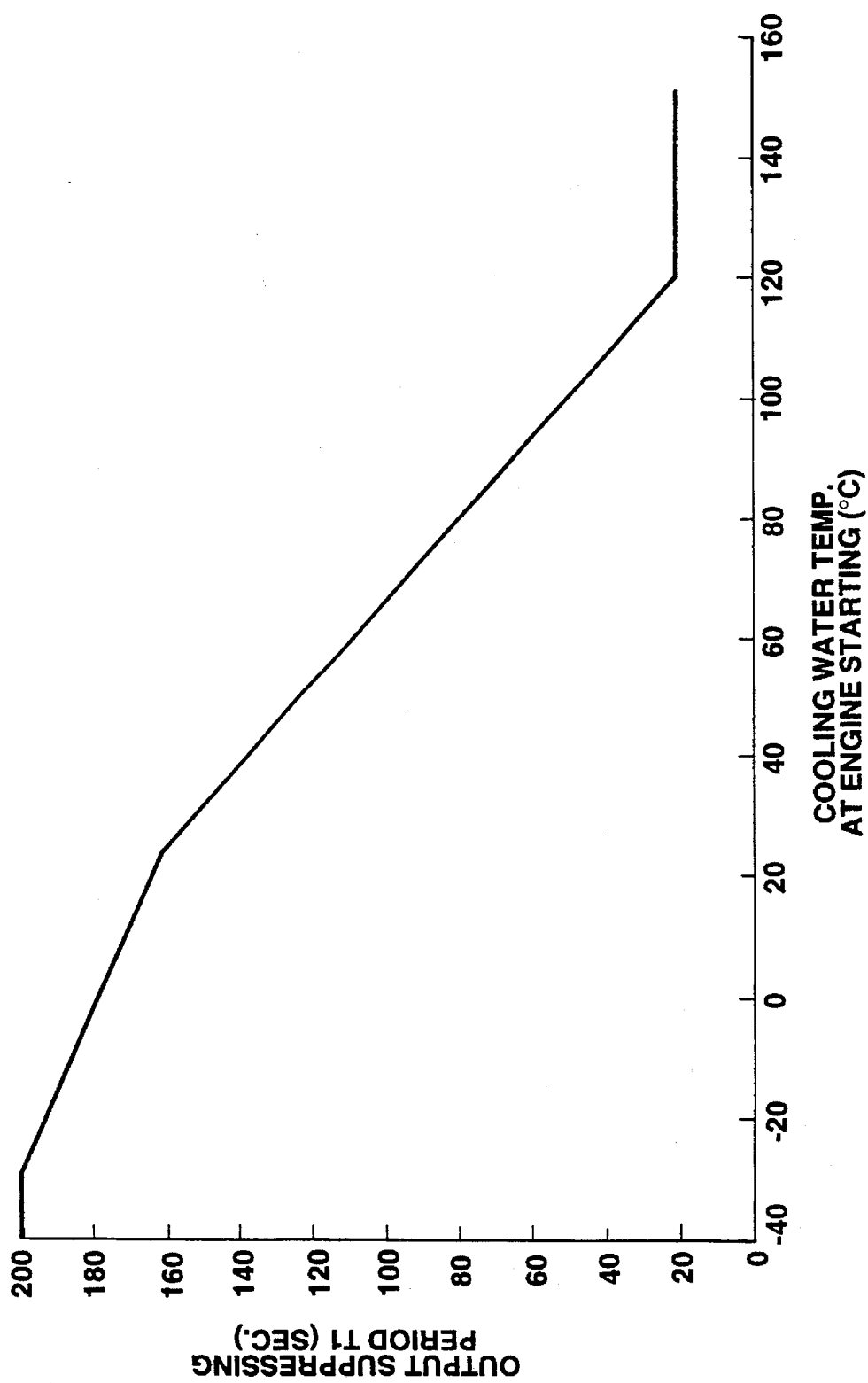

FIG.. 3 is a characteristic view which shows an operating condition of an engine applied to the first embodiment of FIG. 1;

FIG. 4 is a cross-sectional view of an air control valve applied to the first embodiment of FIG. 1;

FIG. 5 is a flow chart showing a control of the engine of FIG. 4;

FIG. 6 is a time chart showing a change of an output of the engine of FIG. 4 at a stating period;

FIG. 7 is a characteristic view which shows a relationship between an output suppressing period T1 and an exhaust emission;

FIG. 8 is a characteristic view which shows a relationship between an output increasing period T2 and the exhaust emission;

FIG. 9 is a characteristic view which shows a relationship between a space speed SV and a conversion ratio of a catalyst;

FIG. 10 is a time chart which shows a change of a catalyst temperature and an output pattern of the engine;

FIG. 11 is a circuit diagram which shows an automatic voltage controller applied to a second embodiment of the electric hybrid vehicle;

FIG. 12 is a characteristic view of a maximum field current relative to a rotating speed of a generator of the second embodiment;

FIG. 13 is a characteristic view which shows a generator torque characteristic and an engine torque characteristic in case that the maximum field current is not limited;

FIG. 14 is a characteristic view which shows the generator torque characteristic and the engine torque characteristic in case that the maximum field current is limited;

FIG. 15 is a block diagram showing a third embodiment of the electric hybrid vehicle in which the output suppressing period is controlled according to a detection of a catalyst temperature;

FIG. 16 is a block diagram showing a fourth embodiment of the electric hybrid vehicle in which the output suppressing period is controlled according to the detection of a cooling water temperature;

FIG. 17 is a characteristic view which shows a relationship between the cooling water temperature and the output suppressing period T1 at an engine starting period; and FIG. 18 is a map of DOD value relative to a battery voltage and a battery charge/discharge current.

DETAILED DESCRIPTION OF THE INVENTION

Referring to FIGS. 1 to 10, there is shown a first embodiment of an electric hybrid vehicle according to the present invention.

As shown in FIG. 1, the electric hybrid vehicle comprises a motor 1 for driving wheels 2 of the vehicle such as a three-phase electric motor. The motor 1 is basically driven by electric power of a battery 3 (secondary battery) through a motor controller 4. The motor controller 4 functions to convert a direct voltage from the battery 3 into a three-phase alternating voltage and to control the rotating speed of the motor 1. A battery charged condition detector 5 is connected to the battery 3 to detect the charged condition of the battery 3 and to output a signal indicative of the battery charged condition to an engine on-off controller 11. The electric hybrid vehicle further comprises a generator 7 which is driven by an engine 6 such as an internal combustion engine. The engine 6 is provided with a catalytic converter 8 in its exhaust system and an air control valve 9 in its intake system. The air control valve 9 is of a solenoid type and functions as an intake air amount controlling means. The air control valve 9 is controlled by an air control valve controller 10 of a micro-computer system.

The engine 6 has a starter motor, an ignition system and a fuel supply system which are controlled by the engine on-off controller 11 although they are not shown in Figures. The engine on-off controller 11 is arranged to operate according to the signal from the battery charged condition detector 5.

Figure 2:
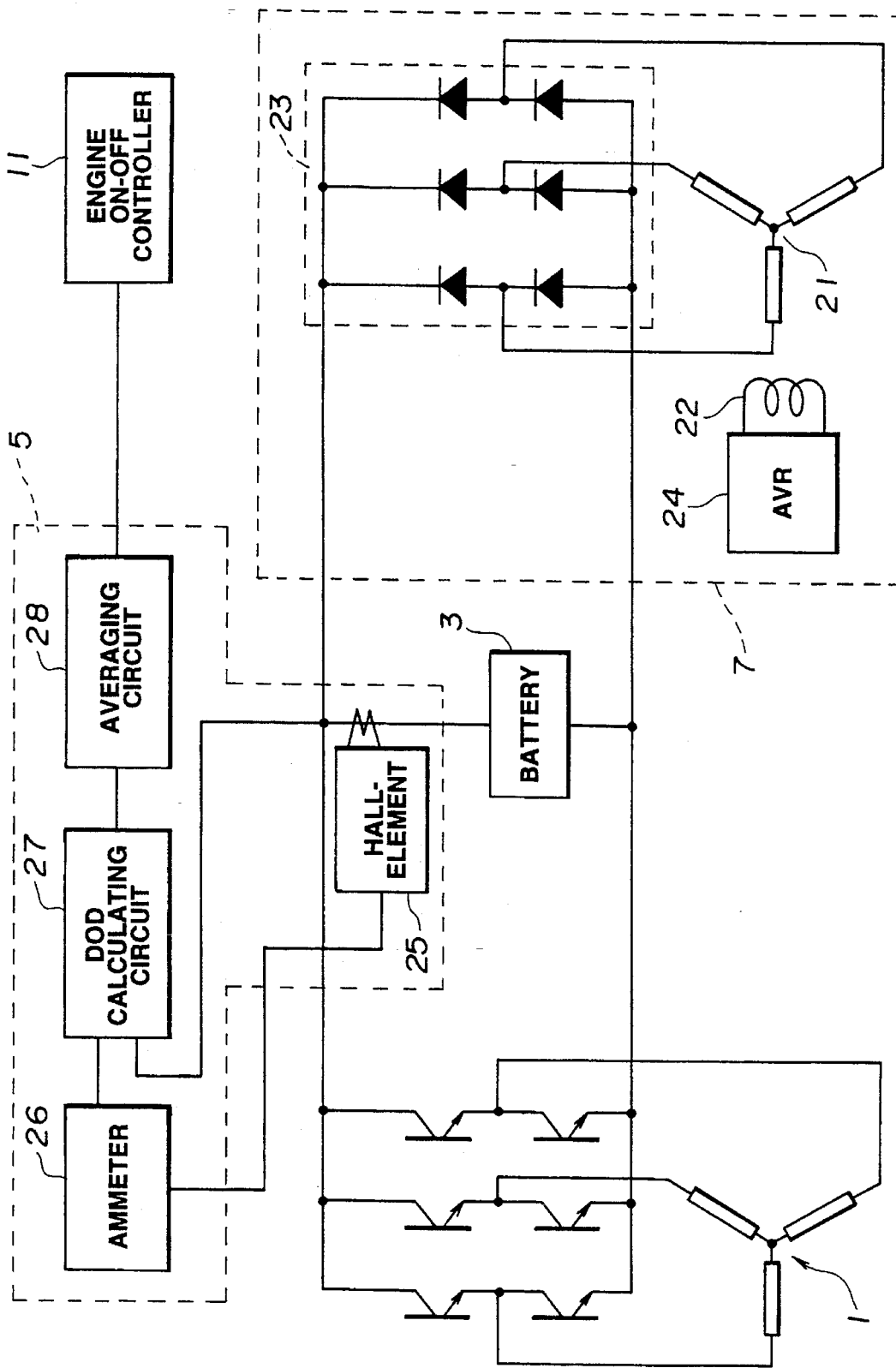
FIG. 2 is a circuit diagram of a battery charged condition detector applied to the first embodiment of FIG. 1.

As shown in FIG. 2, the generator 7 is a three-phase generator and comprises an armature coil 21 and a field coil 22. Furthermore, the generator 7 comprises a three-phase full-wave rectification circuit 23 which converts alternating voltage into direct voltage and a full-automatic voltage controller (AVR) 24 which controls the current of the field coil 22 so as to keep the voltage constant. The electric power generated by the generator 7 is supplied to the motor 1, and the excess thereof is supplied to the battery 3 for recharging.

The battery charged condition detector 5 is provided with a Hall element 25 for detecting the strength of a magnetic field caused by the recharge/discharge current of the battery 3. The Hall element 25 is connected to an ammeter 26 which outputs a current value upon receipt of the signal from the Hall element 25. A DOD calculating circuit 27 is arranged to calculate DOD (Depth of Discharge) % with reference to a map stored in a memory of the micro computer unit in accordance with the current value detected by the ammeter 26 and the battery voltage. The DOD value calculated by the DOD calculating circuit 27 is averaged for a predetermined period by an averaging circuit 28. FIG. 18 shows an example of a map used in the DOD calculating circuit 27. A DOD value of 0% represents a fully charged condition of the battery 3. When the DOD value is 100%, the battery 3 is in an empty (fully discharged) condition.

Figure 3:
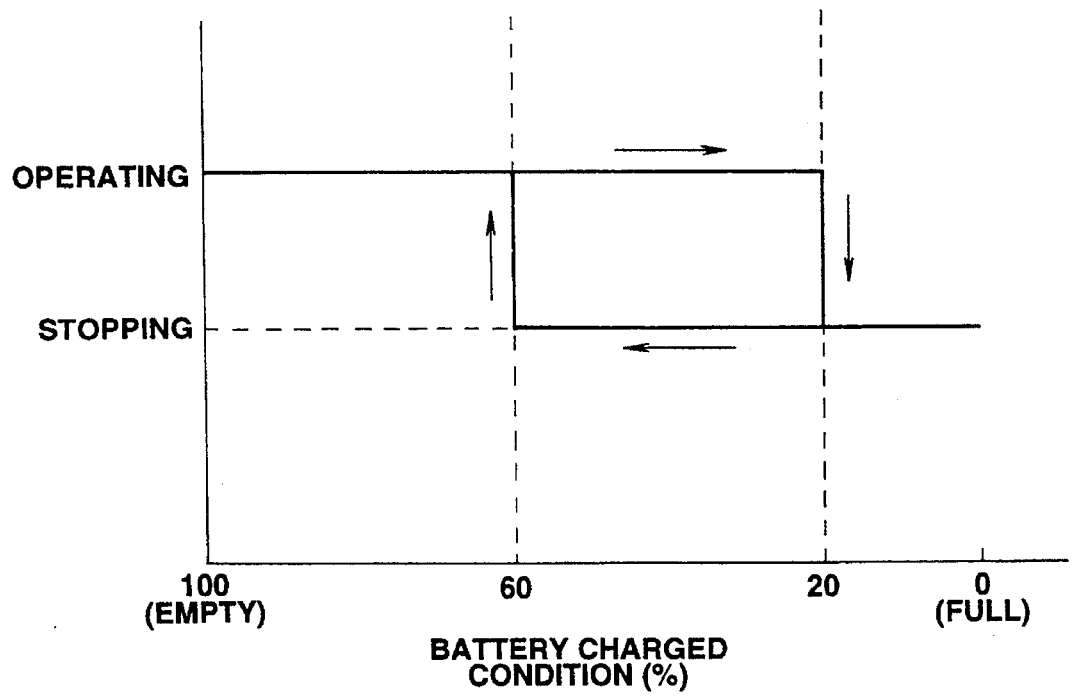

The engine on-off controller 11 controls starting and stopping of the engine 6 on the basis of the DOD value as shown in FIG. 3. That is, when the DOD value becomes larger than or equal to 60%, the engine is started to start power generation by the generator 7. When the DOD value becomes lower than or equal to 20% as a result of the recharging by the generator 7, the engine 6 is stopped. Supply of electric power to the starter motor is implemented during the start of the engine 6 and stopped upon detection that the rotating speed of the engine 6 becomes larger than a predetermined value. The engine on-off controller 11 and the air control valve controller 10 are constituted by the micro computer system.

FIG. 4 shows an example of an air control valve 9 which is provided with a spool by which an inlet port 32 and an outlet port 33 of a housing 31 are opened and closed. A solenoid 35 for driving the spool 34 is connected to an end of spool 34. The solenoid 35 is arranged to be turned on-off by predetermined periodical pulse signals and to continuously control an intake air amount of the engine 6 by means of a variable control of the ON duty ratio.

The manner of operation of the first embodiment of the electric hybrid vehicle will be discussed with reference to a flow chart shown in FIG. 5 hereinafter.

The electric hybrid vehicle is basically driven by electric power of the battery 3. During deceleration of the vehicle the motor 1 functions as a regenerative generator, and the regenerated electric power is supplied to the battery 3.

In a step S101, it is judged whether the charged condition of the battery 3 is lower than a predetermined value or not. That is, it is judged whether or not the DOD value becomes larger than or equal to 60% or not. When the judgment in the step S101 is "NO", the program repeats the step S101. When the judgment in the step S101 is "YES", the program proceeds to a step S102 wherein the engine 6 is started on the basis of the detected signal from the battery charged condition detector 5.

Following the operation of the step S102, in a step S103 an intake air amount to the engine 6 is set at a small amount corresponding to that during an idling period by means of the air control valve 9. With this suppression of engine output just after starting, the total amount of the exhaust gas, which is not warmed and passes through the catalytic converter 8, is decreased, and therefore the amounts of hydrocarbon (HC) and the like are totally suppressed. The catalytic converter 8 is then gradually heated during the output suppressing period.

In a step S104 it is judged whether or not such an output suppressing is continued for a predetermined period such as 2 or 3 minutes after the engine starting. When the judgment in the step S104 is "NO", the program returns to the step S103, and the operation of the steps S103 and S104 is repeated until the judgment in the step S104 becomes "YES". When the judgment in the step S104 is "YES", the program proceeds to a step S105 wherein the amount of the intake air is increased until the generator 7 outputs a rated output. Then, the amount of the intake air is gradually increased by a predetermined rate. That is, since the catalytic converter 8 has not been sufficiently heated during the output suppressing period, the amount of the intake air is gradually increased in such a manner to increase the amount of the exhaust gas with the increase of the catalytic converter temperature, so as not to momentarily degrade the emission characteristics.

In a step S106 it is judged whether or not the rotating speed of the engine 6 reaches a predetermined value where the generator 7 outputs the rated output. When the judgment in the step S106 is "NO", the program returns to the step S105, and the operation of the steps S105 and S106 is repeated until the judgment in the step S106 becomes "YES". When the judgment in the step S106 is "YES", the program proceeds to a step S107 wherein the amount of the intake air is kept on by fixing the air control valve 9.

Accordingly, the output of the engine 6 is changed as shown in FIG. 6. In this embodiment, the optimum values of the output suppressing period T1 and the output increasing period T2 are determined according to the characteristics and installed position of the catalytic converter 8, and the volume displacement and the rotating speed of the engine 6.

FIG. 7 shows a relationship between the output suppressing period T1 and the amount of hydrocarbon HC. In this figure, the total HC amount, which was discharged in one starting operation in that the engine 6 was set at a rated operation just after the starting, is taken as 1, and the other amounts were represented by ratios relative to the amount set as 1. Furthermore, the characteristics lines are described in cases that the output increasing period T2 takes 1 second, 40 seconds and 160 seconds. respectively. As is clear from FIG. 7, the total discharged amount of HC is largely decreased by properly setting the output suppressing period T1. In particular, conversion performance of the catalytic converter 8 is largely changed owing to a space speed SV as shown in FIG. 9. For example, the smaller the space speed SV becomes, the higher the conversion ratio becomes. In addition, during a low temperature idling where the temperature is lower than the activated temperature, the above-mentioned tendency is remarkably accelerated. Accordingly, by possibly decreasing the amount of exhaust gas, the conversion ratio is kept at a high value. Although the discharged amount of HC is decreased with the increase of the output suppressing period T1, the excessive increase of the output suppressing period T1 invites increase of the amount of HC. That is, the temperature of the catalytic converter 8 is not sufficiently increased by the exhaust gas during the output suppressing period T1, and the exhaust gas is kept discharging without being sufficiently converted by the catalytic converter 8. As a result of this, the total amount of the discharged amount of HC is increased. Accordingly, it is necessary to determine the output suppressing period T1 within the range where such a trouble is prevented.

FIG. 8 shows a relationship between the output increasing period T2 and the total amount of HC. In this figure, the characteristics lines are described in cases that the output suppressing period T1 takes 1 second, 80 seconds and 160 seconds, respectively. As is clear from FIG. 8, the further decrease of the total amount of HC is achieved by gradually increasing the output of the engine 6 upon properly determining the output increasing period. That is, by properly determining the output increasing period, the rising of the temperature of the catalytic converter 8 and the increase of the exhaust gas are properly synchronized as shown in FIG. 10. Accordingly, the transitional degradation of the exhaust emission is avoided. In FIG. 10, a short and long dash line indicates a conventional pattern in which the exhaust gas amount is set at a maximum value form the start of the engine, so that the rising of the temperature of the catalytic converter 8 takes a relatively delayed pattern.

Although this embodiment has been shown and described such that temperature of the catalytic converter is raised only by the exhaust gas, it will be understood that an electric heat may be applied to the catalytic converter in order to further acceleratingly raise the temperature of the catalytic converter.

FIG. 11 shows an automatic voltage controller 24 applied to a second embodiment of the electric hybrid vehicle according to the present invention. The second embodiment is generally similar to the first embodiment except that a different type of an automatic voltage controller 24 from that of the first embodiment is applied to the second embodiment.

The automatic voltage controller 24 comprises a field current detector 41 which detects a current of a field coil 22. A rotating speed detector 42 is connected to the generator 7 in order to detect a rotating speed of the generator 7 by means of a pulse counter and the like. A maximum field current calculating circuit 43 is also connected to the generator 7 in order to output a maximum field current at the rotating speed from the rotating speed detector 42. A comparator 44 is connected to the maximum field current calculating circuit 43 and the field current detector 41 in order to compare the output of the maximum field current calculating circuit 43 and the output of the field current detector 41. The output of the comparator 44 is connected to an AND circuit 47 which turns on and off a transistor 46 for controlling the field current. A comparator 45 receives a voltage at a point A in proportion to the generator voltage and a voltage at a point B in proportion to the target voltage in order to compare the voltage values between the points A and B.

Although in this embodiment the rotating speed of the engine 6 is applied to the automatic voltage controller 24, it will be understood that the rotating speed of the generator 7 may be applied to the controller 24 instead of the rotating speed of the engine 6 since the engine 6 and the generator 7 are interlocked at a predetermined rate.

With this arrangement, the transistor 46 is turned on when the field current is smaller than a maximum field current at its rotating speed and the generating voltage is smaller than or equal to the target voltage. That is, the field current is controlled not so as to increase over the maximum field current which is previously applied relative to each rotating speed. The relationship between the rotating speed of the generator 7 and the maximum field current is represented in FIG. 12 such that the maximum field current becomes minimum at an intermediate rotating speed. However, since the torque characteristics of the generator 7 are normally arranged such that the torque becomes maximum at an intermediate rotating speed as shown in FIG. 13, it is difficult to take a suitable matching with the torque characteristics of the engine 6. Accordingly, the rating point of the generator 7 is offset from the best fuel consumption mode of the engine 6. This degrades the fuel consumption and necessitates a larger engine which generates a larger torque than a required torque for the generator 7. In contrast, by arranging the field current as shown in FIG. 12, the torque characteristics take a curve as shown in FIG. 14. This enables the engine to drive at the best fuel consumption point. Accordingly, it becomes possible to largely decrease the fuel consumption ratio and to use a smaller engine in capacity.

FIG. 15 shows a third embodiment of the electric hybrid vehicle according to the present invention. The third embodiment is generally similar to the first embodiment except that a temperature sensor 51 for detecting the catalyst temperature of the catalytic converter 8 is installed to the catalytic converter 8. In the third embodiment, the amount to the intake air is suppressed until the temperature detected by the temperature sensor 51 reaches a predetermined temperature such as 120° C as shown in FIG. 10.

With this arrangement, even if the outside temperature condition and the engine thermal condition are variously changed, it is possible to set the output suppressing period T1 so as to fit with the catalyst performance. Accordingly, a sufficient emission control is implemented. Furthermore, since an excessive output suppressing after the proper raising of the catalyst temperature is avoided, the recovery of the battery 3 is quickened.

FIG. 16 shows a fourth embodiment of the electric hybrid vehicle according to the present invention. The fourth embodiment is generally similar to the first embodiment except that a water temperature sensor 52 for detecting a temperature of cooling water of the engine 6 is installed to the engine 6. In the fourth embodiment, the output suppressing period T1 is determined according to the cooling water temperature at a starting of the engine 6. As shown in FIG. 17, the output suppressing period T1 is determined such that the lower the cooling water temperature at becomes engine starting, the longer the output suppressing period T1 becomes, and such that the higher the cooling water temperature becomes, the shorter the output suppressing period T1 becomes. That is, the output suppressing period T1 is properly determined upon taking into consideration with the seasonal temperature condition and the thermal condition of the engine 6.

What is claimed is:

1. An electric hybrid vehicle comprising:
   a motor for driving a vehicle body of the electric hybrid vehicle;
   a battery for an electric source of said motor, said battery being repeatingly rechargeable;
   a generator connected to said battery;
   an engine connected to said generator and connected to a catalytic converter for purifying exhaust gas from said engine, said engine being operated in a normal condition such that said generator outputs a rated output;
   means for controlling the amount of intake air to said engine; and
   means for suppressing the amount of the intake air at a predetermined small flow rate by means of said intake air amount controlling means for a desired time after starting of said engine.

2. An electric hybrid vehicle as claimed in claim 1, further comprising a means for controlling ON-OFF operation of said engine and a detector for detecting a charged condition of said battery, said engine ON-OFF controlling means controlling said engine according to a signal indicative of the charged condition of said battery from said detector.

3. An electric hybrid vehicle as claimed in claim 1, further comprising a catalyst temperature detecting means which detects a temperature of the catalytic converter, said suppressing means controls the intake air amount by means of said intake amount controlling means until the temperature detected by said catalyst temperature detecting means reaches a predetermined temperature.

4. An electric hybrid vehicle as claimed in claim 1, further comprising a coolant temperature detecting means which detects a temperature of engine coolant, said intake air amount suppressing means determining the desired time after starting of said engine according to the coolant temperature detected by said coolant temperature detecting means.

5. An electric hybrid vehicle as claimed in claim 1, further comprising a means for gradually increasing the amount of the intake air after the desired time for suppressing the amount of the intake air to said engine.

6. An electric hybrid vehicle as claimed in claim 1, wherein said generator comprises a three-phase generator including an armature coil and a field coil, wherein said generator is arranged such that a maximum field current becomes minimum at an intermediate rotating speed.

7. An electric hybrid vehicle as claimed in claim 1, wherein said generator comprises a three-phase generator including an armature coil and a field coil, wherein the field current of said generator is controlled so as not to increase over a maximum field current which is previously applied relative to each rotating speed.

8. An engine system for driving a generator applied to an electric vehicle, said engine system comprising:
   an internal combustion engine intermittently operating for generating electric power by operation of the generator and connected to an intake system and an exhaust system;
   an intake air control valve connected to the intake system; and
   an intake air control valve controller controlling said intake air control valve so as to suppress the intake air amount at a predetermined small flow rate for a predetermined time after starting of said engine.

9. An engine system as claimed in claim 8, wherein the exhaust system of said internal combustion engine has a catalytic converter, a temperature of the catalytic converter rising to a predetermined operational value after the predetermined time for suppressing the amount of the intake air.

10. An electric hybrid vehicle comprising:
    a motor for driving a vehicle body of the electric hybrid vehicle;
    a rechargeable battery for an electric source of said motor;
    a generator connected to said battery;
    an engine connected to said generator and operated in a normal condition for outputting a rated output;
    said engine further connected to a catalytic converter purifying exhaust gas from said engine;
    means for controlling an amount of intake air to said engine; and
    means for causing said intake air amount controlling means to reduce the amount of intake air to a predetermined flow rate, lower than a rate for outputting said rated output, for a predetermined suppressing time period substantially immediately following starting of said engine.

11. An electric hybrid vehicle as recited in claim 10, wherein said means for causing operates for causing said intake air amount controlling means to reduce said amount of intake air to an amount corresponding to idling of said engine.

12. An electric hybrid vehicle as recited in claim 11, wherein said means for causing further operates for causing said intake air amount controlling means to increase the amount of intake air from said predetermined flow rate during said suppressing time period at a predetermined rate during a predetermined increase time period following said suppressing time period.

13. An electric hybrid vehicle as recited in claim 10, further comprising:
    battery charge-state detecting means for outputting a signal indicative of a charge-state of the rechargeable battery; and
    ON-OFF control means for controlling ON-OFF operation of said engine;
    wherein said ON-OFF control means operates for starting the engine in response to an indication by said output signal from said detecting means of a charge-state of the rechargeable battery lower than a first predetermined value.

14. An electric hybrid vehicle as recited in claim 13, wherein said ON-OFF control means operates for stopping the engine in response to an indication by said output signal from said detecting means of a charge-state of the rechargeable battery higher than a second predetermined value greater than said first predetermined value.

15. An electric hybrid vehicle as recited in claim 10, wherein said means for causing further operates for causing said intake air amount controlling means to increase the amount of intake air from said predetermined flow rate during said suppressing time period at a predetermined rate during a predetermined increase time period following said suppressing time period.

* * * * *